(12) United States Patent
Pyron et al.

(10) Patent No.: US 7,615,714 B2
(45) Date of Patent: *Nov. 10, 2009

(54) BUTTON STYLE CORD CONNECTOR

(75) Inventors: Roger Pyron, Arlilngton, TN (US); Craig Yoss, Collierville, TN (US); Andrew C. Cole, Memphis, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 108 days.

This patent is subject to a terminal disclaimer.

(21) Appl. No.: 11/749,974

(22) Filed: May 17, 2007

(65) Prior Publication Data

US 2007/0254525 A1 Nov. 1, 2007

Related U.S. Application Data

(63) Continuation-in-part of application No. 11/491,221, filed on Jul. 21, 2006, now Pat. No. 7,332,678.

(60) Provisional application No. 60/701,415, filed on Jul. 21, 2005.

(51) Int. Cl.
*H02G 3/18* (2006.01)

(52) U.S. Cl. .................................... 174/660

(58) Field of Classification Search ............. 174/153 G, 174/650, 654, 659, 660, 666, 667, 668, 669; 248/56

See application file for complete search history.

(56) References Cited

U.S. PATENT DOCUMENTS

| | | | |
|---|---|---|---|
| 2,458,409 A | 1/1949 | Paige | |
| 3,351,974 A | 11/1967 | Wilhelmi | |
| 3,365,761 A | 1/1968 | Kalvig | |
| 3,516,111 A | 6/1970 | Heyman | |
| 3,689,014 A | 9/1972 | Fink | |
| 3,788,655 A | 1/1974 | Hathaway | |
| 4,299,363 A | 11/1981 | Datschefski | |
| 4,350,839 A | 9/1982 | Lass | |
| 4,361,302 A | 11/1982 | Lass | |
| 5,037,326 A | 8/1991 | Reedy | |
| 5,410,104 A | 4/1995 | Gretz et al. | |
| 5,442,141 A * | 8/1995 | Gretz | 174/153 G |
| 5,454,479 A | 10/1995 | Kraus | |
| 5,658,110 A | 8/1997 | Kraus | |

(Continued)

OTHER PUBLICATIONS

Tapper Sealing Technology AB, Title: Cable Entries, twelve (12 pages), published Feb. 16, 2005, published in Sweden, info@tappersealingtechnology.com, www.tappersealingtechnology.com.

(Continued)

*Primary Examiner*—Neil Abrams
(74) *Attorney, Agent, or Firm*—Hoffmann & Baron, LLP

(57) ABSTRACT

This invention pertains to a cord connector that both seals and provides strain relief automatically upon wire insertion. The cord connector comprises a wire passageway through a pliable shell which seals around both the wire inserted through the passageway as well as the knock-out or wall opening into which the connector is secured. A more rigid skeleton supports this shell and is provided with appendages which permit the wire to pass through the passageway but which block or resist any removal of the wire from the passageway. Preferably the shell is over-molded over the skeleton for ease of manufacture.

50 Claims, 11 Drawing Sheets

U.S. PATENT DOCUMENTS 6,179,646 B1     1/2001    Horchler
7,211,744 B2 *   5/2007    Jorgensen .................. 174/668

OTHER PUBLICATIONS

Tapper Sealing Technology, Title: Cable and Pipe Entries, eleven (11 pages), published Mar. 22, 2005, published in Sweden, info@tappersealingtechnology.com, www.tappersealingtechnology.com.

Tapper Sealing Technology AB, Title Environmental Facts, produced by E.L. Electrical Materials Suppliers Association, the material is based on Nuteks project "Advice for Purchasers", seven (7 pages), info@tappersealingtechnology.com, www.tappersealingtechnology.com.

* cited by examiner

__US 7,615,714 B2__

BUTTON STYLE CORD CONNECTOR

This application is a continuation-in-part of U.S. application Ser. No. 11/491,221, filed Jul. 21, 2006, now U.S. Pat. No. 7,332,678 which claims the benefit of U.S. Provisional Application No. 60/701,415, filed Jul. 21, 2005.

FIELD OF THE INVENTION

This invention, in general, pertains to cord connectors for supporting electrical wire to a wall or a panel of an enclosure. More particularly, the present invention pertains to a connector for an electric cable providing both sealing and strain relief characteristics.

BACKGROUND OF THE INVENTION

Cord connectors for supporting electric wire passing through an aperture of an electrical enclosure or a wall are well known. These cord connectors are often used to protect wires or tubes passing through such apertures against wear or shock or both.

U.S. Pat. No. 2,458,409 and U.S. Pat. No. 3,516,111 disclose a bushing-type connector member with integral spring-like fingers or supports radiating about an epicenter. These fingers or supports are adapted to accept and cooperate with an inserted cable member but prevent reverse-axial movement of the cable member after it is inserted into the knockout hole through the connector member.

U.S. Pat. No. 4,299,363 and U.S. Pat. No. 5,410,104 disclose a compressible device having a plurality of ribs or jaws directed toward the axis center of the device with spaces between the apexes.

These devices are typically pushed or otherwise inserted into an opening in the enclosure such as a knock-out of an electrical outlet box or panel. Once the connector is in place, a wire or cable is then pushed through its center and into the enclosure for subsequent termination with an electrical device or fixture inside the box. The connector itself is generally configured with a plurality of inwardly extending fingers that engage and grip the wire and which permit the wire to be pushed into the box but which make it difficult to pull the wire back out of the box.

Although most such devices may be suitable at providing strain relief to the inserted wire, their constructions, and particularly their finger components are such that they are unable to also seal around the wire and provide weather protection in order to prevent moisture from passing into the box without requiring multiple assembly from both sides of a partition or through other complex means such as a threaded end caps.

DESCRIPTION OF THE RELATED ART

A device which has many other shortcomings is shown in FIGS. 1 through 6. Reference numeral 10 generally indicates a two-component (a skeleton with a flexible outer membrane) grommet 10 having a wide tubular sleeve wall (shown as 20 in FIG. 4). The tubular sleeve wall 20 expands radially outwardly at both ends into a top and a bottom circular extensions (12, 14) in an inverted umbrella-like manner and also expands radially inwardly at ends into central portions (17, 19) to define a set of small apertures 16, 18 in the center.

As can be seen in FIG. 1, the top circular extension 12 is divided by a circumferential ridge 22 into two portions, an inner middle section 24 and an outer peripheral section 26. The outer peripheral section 26 has a smaller outer diameter 27 than the diameter 28 of the bottom circular extension 14.

The surface of the inner middle section 24 is sloped downward toward the opposite side, the bottom circular extension 14. The outer diameter 27 of the top circular extension 12 is partly broken by a couple of tabs 30, and 30'.

As shown in FIG. 2, the surface of the bottom circular extension 14 slopes downward in a curvilinear manner from the small aperture 18. The bottom ridge 23 divides the bottom circular extension 14 into a directionally flexible inner middle position 25 and outer peripheral portion 27.

Referring to FIG. 3, the inner skeleton portion 32 is shown. As can be seen, the skeleton portion 32, which is substantially tubular along its base body 34, is over-molded and finished with the outer membrane described above. This skeleton portion 32 includes a pair of upright walls 35 on both sides of the tabs 30, 30' with an outer flange 36 at the bottom end 38. At the distal top ends 39, inwardly directed arc-shaped fingers 33 extend there from and curve back towards the bottom (clearly seen in FIG. 4). Two tabs 30, 30' are supported by the flange 36. The flange 36 is also shown to have small holes 43 so that the rubber coated relief can be molded more tightly around the flange 36.

Referring to FIG. 4, a cross section view along the line A-A of FIG. 3 is shown. As can be seen, since the arc-shaped distal ends of the fingers 33 are created at a distance away from the small aperture 16, the flange 36 itself does not retain the inserted cable with much force. In essence, the tips or apex 44 of the arc-shaped fingers 33 are quite spread away from each other and away from the center, leaving a large central gap 45 with limited resistance. Because of this large central gap 45, only large size cables can engage arc-shaped fingers 33. And thus, this design is useful for only a limited range of cable sizes, shapes and gauges. Further, the arc-shaped fingers 33 extend from the wall's distal top end 39. Due to the distance between the flange 36, and the base of arc-shaped fingers 33, over time, the cable retention force will be diminished considerably.

Further, as can be seen in FIG. 4, the thickness of each arc-shaped finger 33 stays constant throughout. The flexibility will mostly occur at the base portion. Because the arc-shaped fingers 33 flex from their bases at the distal end 39 due in part to their wide width, thus resisting greater deflections or flexibility. This makes insertion and pullout removal for re-usage utterly impossible. Also, the upright walls 35 extend about even with the wall catches (circumferential ridge), leading to a bulkier and thicker design, which could cause interference with other parts in the box. Also, due the size of the device itself, the design fits only within certain standard opening sizes. In fact, these devices are not manufactured for non-standard sizes.

The cross section view of FIG. 4 also shows that only the inner middle section 24 is supported by the arc-shaped fingers 33. The outer peripheral section 26 of the top portion and the bottom extension 27 of the bottom portion are not supported by the skeleton and are separated by a space region 11.

As can be seen in FIG. 4, the device has two central portions 17, 19 of which at least the central portion 19 encompasses an open aperture 18 characteristics. In practice, moisture and debris can collect inside the device via this hole which is not desirable at all. Thus, the device can not be used as a plug due to the device having two walls defining a debris-collecting storage space.

As can be seen in FIG. 5, the outer peripheral portion 27 abuts on one side of the wall after insertion. The cable 58 is then pushed through the device from opposite side of the wall as seen in FIG. 6. Because of the arc-shaped finger's position distanced away from the flange 36 and its angle, the cable 58 insertion is made difficult according to the design. As can be seen in FIG. 6, once the grommet 10 is in place, the installer now needs to focus on the other side 47 of the wall 48 in order to insert a cable 58. In tight spaces, or a wall where other side is not easily accessible, such installation can be frustrating.

SUMMARY OF THE INVENTION

An object of the invention is to provide a cord connector with a pliable shell having a wire passageway therethrough, a more rigid skeleton adjoining the shell also having a wire passageway therethrough, the skeleton having deflectable appendages which are deflected by the passage of a wire through the wire passageway, the deflectable appendages further restricting the removal of the wire back through the wire passageway; and whereby the pliable shell seals around the wire in the wire passageway and the skeleton provides strain relief to the wire in the wire passageway.

In another aspect of the invention, a cord connector assembly is provided that includes a rigid skeleton part characterized by a circumferential hoop, the skeleton part having an outer flange and at least a pair of inwardly jutting pronged cable supports adjacent the end, and at least a radially outwardly protruding tab on another distal end; and a pliable shell over-molded around at least a portion of the rigid skeleton part, the pliable shell having a center portion shaped to allow passage of a cable wire and provide strain relief to the cable wire but prevent passage of contaminants, wherein the protruding tab is configured to be pressed through a wall opening and the protruding tab and the outer flange are fashioned to jointly and directly impart more force on either sides of the wall for extension of the pliable shell.

In further yet another aspect of the invention, a method of manipulating a connector for insertion into and removal out of a wall aperture for re-usage of the connector is provided wherein, the method includes providing a connector comprising a rigid skeleton part characterized by a circumferential hoop with an end and another distal end, the skeleton part having an outer flange and at least a pair of inwardly jutting pronged cable supports adjacent the end, at least a radially outwardly protruding tab on another distal end; and a pliable shell over-molded around at least a portion of the rigid skeleton part, the pliable shell having a center portion shaped to allow passage of a cable wire and provide strain relief to the cable wire but prevent passage of contaminants, wherein the protruding tab is configured to be pressed through a wall opening and the protruding tab and the outer flange are fashioned to jointly and directly impart more force on either sides of the wall than an extension of the pliable shell; and skew/pivot the connector on the cable so that the connector projects outward from the cable at a 45 or less degree angle rather than at its normal 90 degrees; and slide off the connector off the cable once the fingers are mis-aligned with each other.

These and other advantages of this invention will become apparent from the following detailed description, which, taken in conjunction with the annexed drawings, discloses the preferred embodiment of the invention.

BRIEF DESCRIPTION OF THE DRAWINGS

The invention will be more fully understood from the following detailed description taken in conjunction with the accompanying drawings which form a part of this application, wherein like numerals referred to like parts and in which.

DETAILED DESCRIPTION OF THE PREFERRED EMBODIMENT

Figure 1:
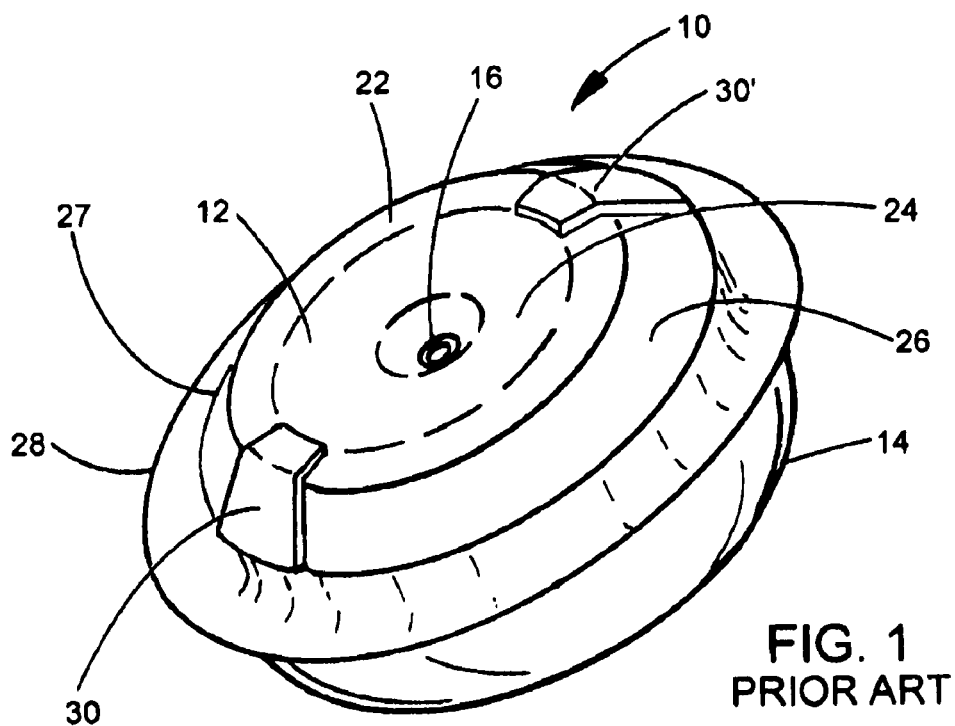
FIG. 1 is a top perspective view of a prior art device.
Figure 2:
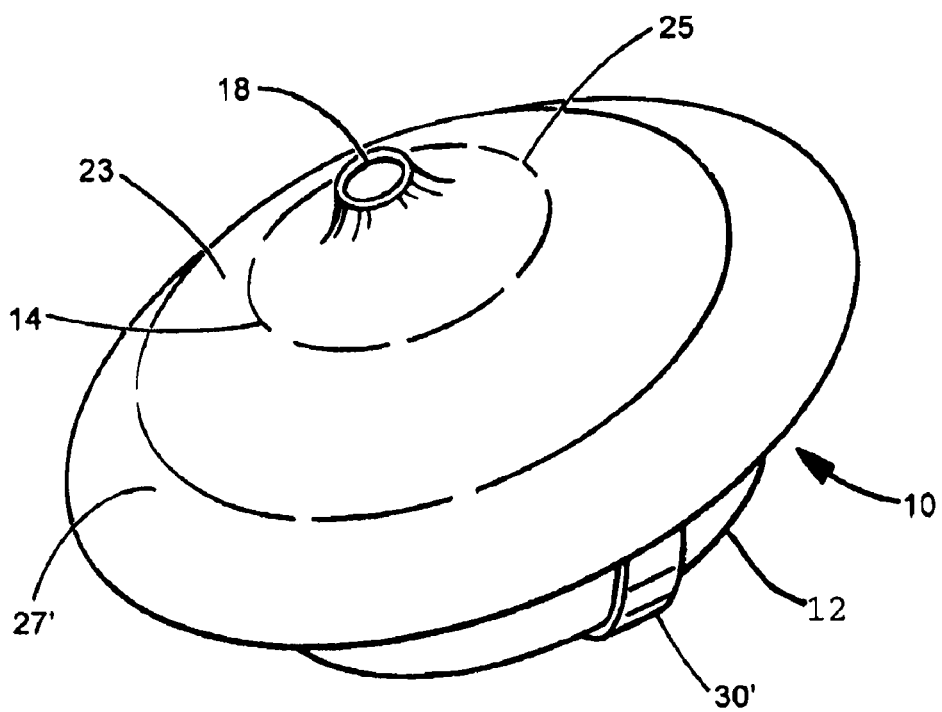
FIG. 2 is a perspective view showing the opposite side of the device as shown in FIG. 1.
Figure 3:
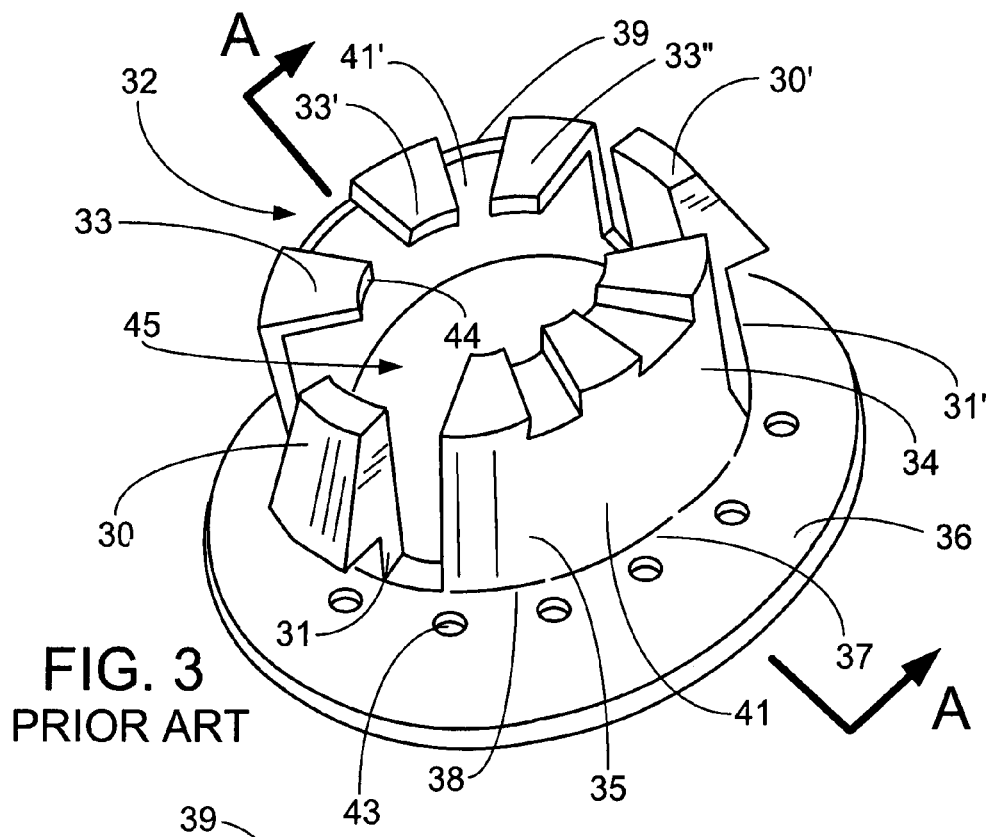
FIG. 3 is a top perspective view showing only the inner skeleton of the device as shown in FIG. 1.
Figure 4:
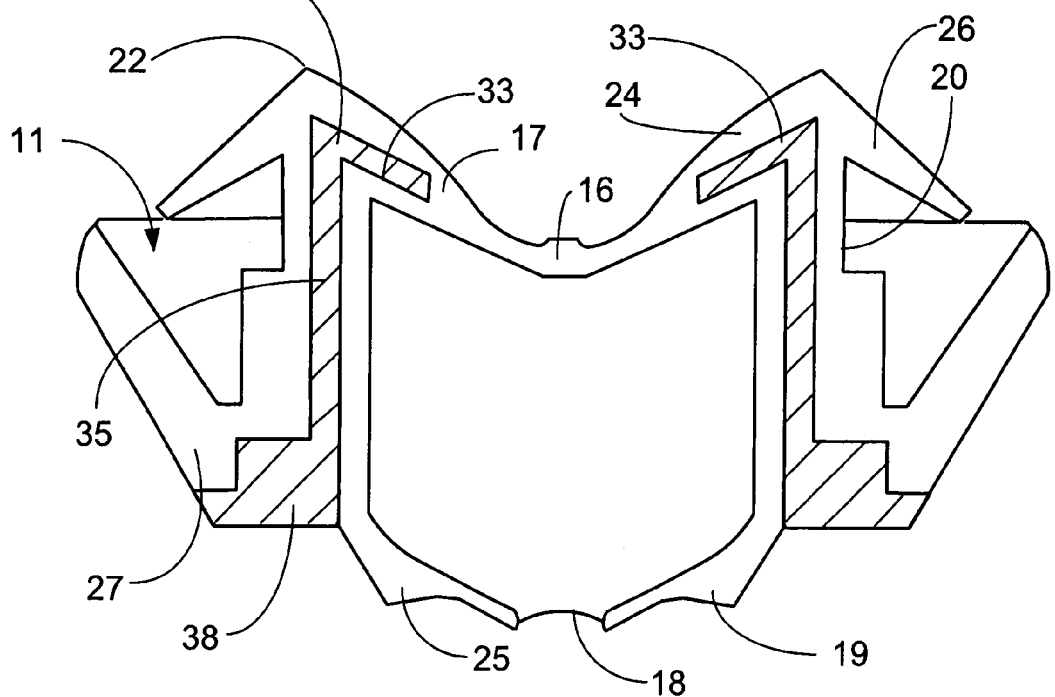
FIG. 4 is a sectional view of the device as shown in FIG. 1 along the A-A plane.
Figure 5:
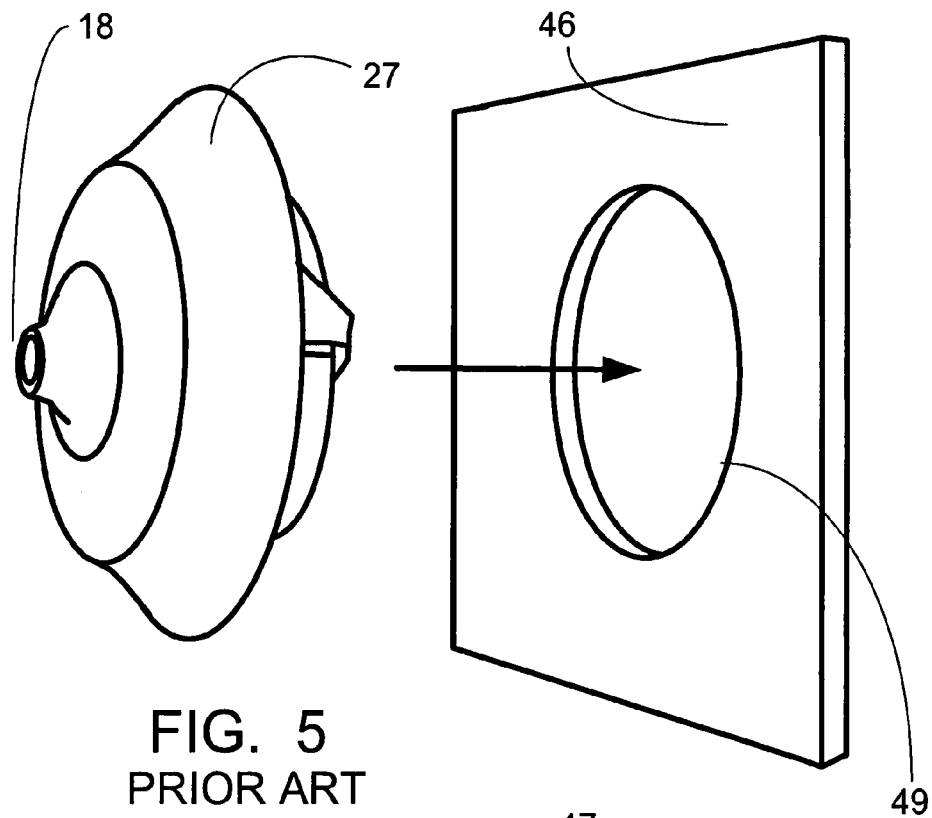
FIG. 5 is a graphical illustration showing an initial step in installation of the prior art device as shown in FIG. 1.
Figure 6:
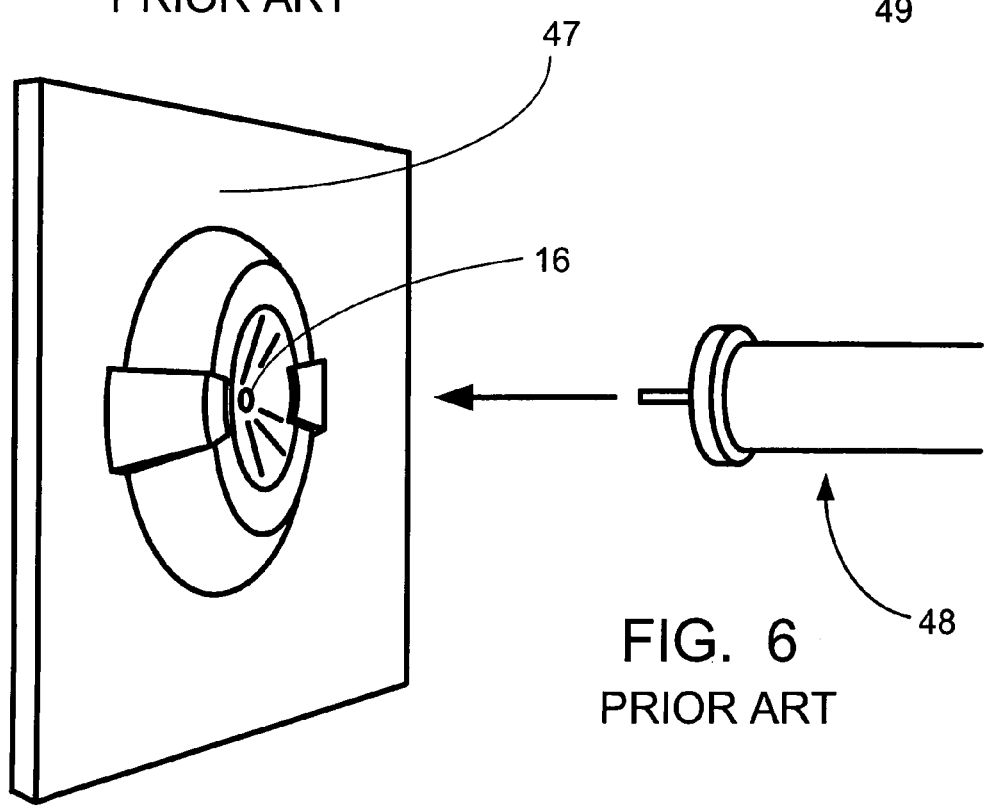
FIG. 6 is a graphical illustration showing the following step after the step shown in FIG. 5 in installing the prior art device shown in FIG. 1.
Figure 7:
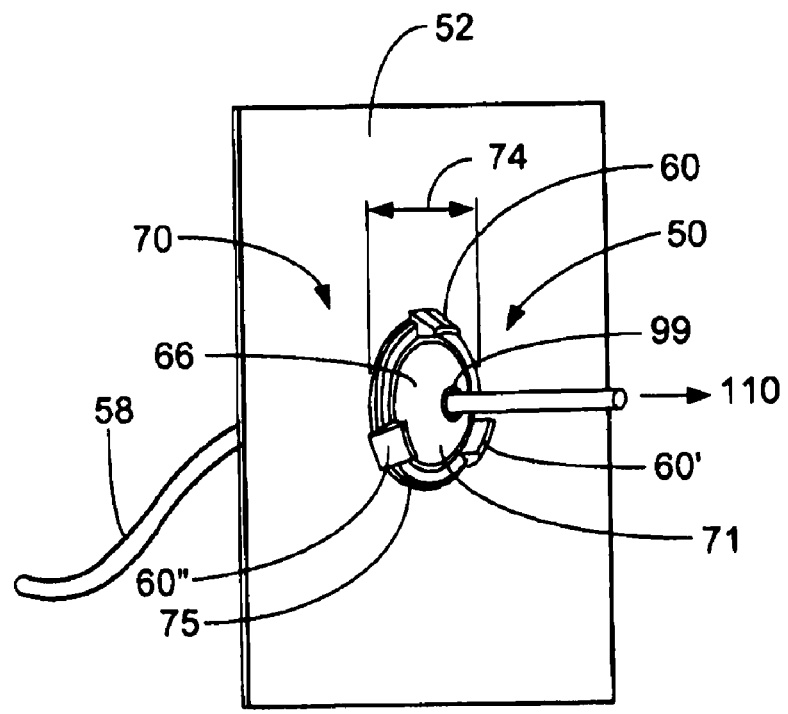
FIG. 7 is a perspective view of the present invention in cooperation with a cable or wire.
Figure 8:
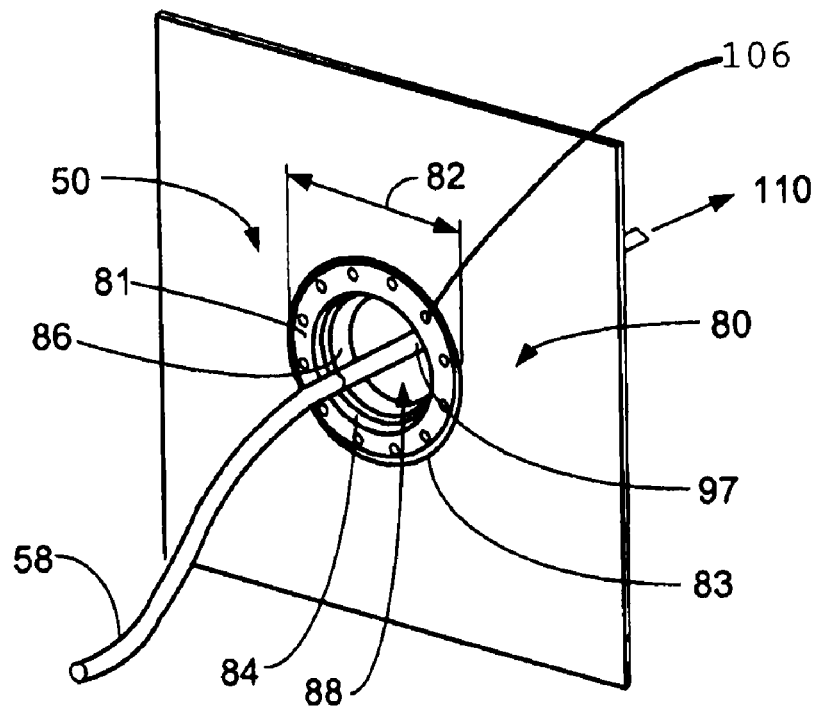
FIG. 8 is a perspective view showing the opposite side of the view shown in FIG. 7 of the present invention in operation with a cable.

As can be seen in FIGS. 7 and 8, reference numeral 50 generally indicates a preferred embodiment of the invention, a button style cord connector that can be applied to a box 54 (of which only the indicated portion of wall 52 is shown) and accommodate a wire cable 58 through thereafter.

The connector 50 is generally a two-sided button-shape device with a substantially circular body having an insertion side portion 70 that is configured preferably with an axially short but radially wide center shaft. The tail side 80 can be configured with an overarching inverted mushroom-roof like projection which extends over the center shaft.

Although the insertion side portion 70 may vary in design, one particular embodiment can be designed as follows: The insertion side portion 70 can be designed as an axially compact pointed head 71 having a central egress side aperture 99. Because the pointed head 71 is typically designed to be less bulky, it does not protrude extensively into the interior of the enclosure, reducing the likelihood of any interference with other devices therein. The pointed head 71 may preferably include a sloping surface 66 extending from the apex of its central egress side aperture 99 to an outer perimeter 75 of a particular diameter 74 that can be designed to fit the diameter of a knock-out hole of the wall 52. At the outer perimeter 75, the pointed head 71 may be designed with a substantially cylindrical body 92 (shown in FIG. 10) running a limited distance from the outer perimeter 75 to the tail side 80. This cylindrical body 92 may be provided parallel to the central axis 110. Moreover, the substantially cylindrical body 92 can be interrupted at various disjointed locations to include a plurality of tabs 60, 60' and 60" spaced apart from each other to assist in the insertion mode.

Referring to FIG. 8, the tail side 80 is shown. The tail side 80 may include an overarching mushroom-roof like projection 81 having an outermost diameter 82 larger than the diameter 74 of the pointed head 71. As can be seen, the center portion of the tail side 80 can be designed as a cavity space 88 with a central ingress aperture 97, the cavity space 88 being defined by the shape of the hollow reverse side of the sloping surface 66. Diametrical to the outer sloping surface 66, the cavity space 88 includes an inner sloping surface 86 extending from the central ingress aperture 97 to the inner perimeter 84. The inner perimeter 84 may define the end of the inner cylindrical body 92 running a limited distance to the end of the overarching projection 81. The overarching projection 81 extends radially outward to an extent and curves toward the direction of the pointed head 71 to define the hollow curvature plate-shaped or overarching projection 81 with an outer elastomeric extension perimeter 83.

Figure 9:
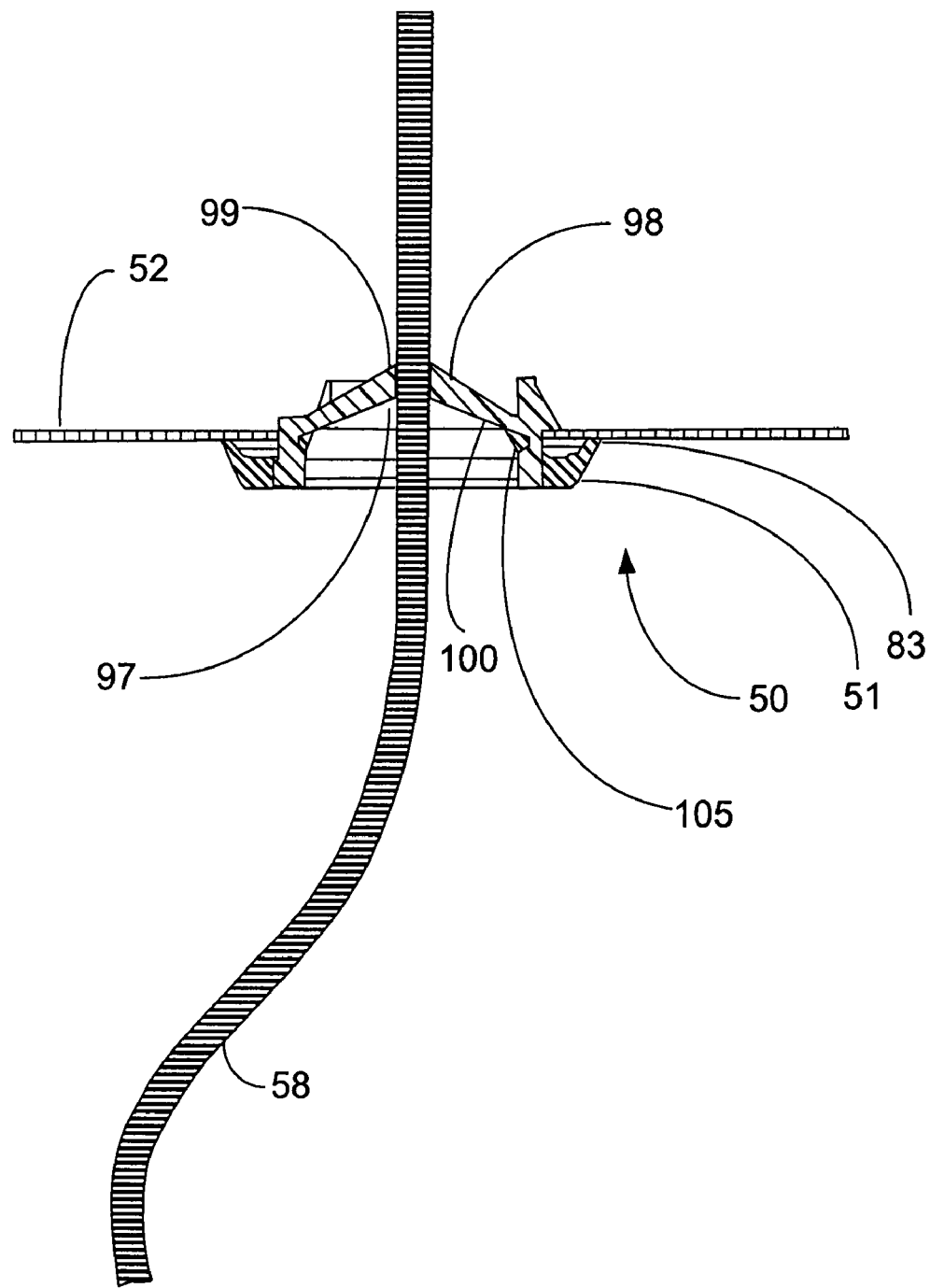
FIG. 9 is a cross-sectional view of the embodiment shown in FIG. 7 with the view taken along lines B-B of FIG. 7.

Referring to FIG. 9, a wire passageway 98 may be provided between the central ingress aperture 97 and the central egress side aperture 99, possibly with a thin perforable membrane portion. While FIGS. 7 and 8 show this wire passageway 98 as being centrally located, that need not be the case. Wire passageway 98, may intentionally be sized to be slightly smaller than the smallest wire cable 58 that can extend therethrough.

FIG. 9 also shows that the single unit connector 50 consists of two separate components, an outer shell body 51 and an inner skeleton portion 100. Thus, inner skeleton portion 100 can be employed within the shell body 51 to impart stiffness and rigidity to the connector 50. The shell body 51 and the inner skeleton portion 100 can be integrally molded to each other; the connector 50 thus can be integrated construction and preferably formed from, although not limited to, a suitable material of the polymeric type such as elastomer, rubber, plastic, nylon or the like. A preferred material can be one that provides the desired resilient flexibility, self-lubricating and dielectric qualities, and corrosion resistant and non-metallic nature that are preferred for practicing the invention. Thus formed, the one-piece construction which can be adapted for ready application to a box outlet can be installed without requiring special tools, clamps, or any additional parts at the installation site.

Normally, the shell body 51 would be over-molded onto the skeleton portion 100 but other methods of manufacture are equally possible. Because flexible shell body 51 and more rigid skeleton portion 100 may be formed or molded together, they act in tandem as a single unit for the user to handle, even though these different components provide different functions to the connector 50. Due to such over-molding, it may occur that these two components are preferably fused or molded into a single integral unit, but this need not be the case as the connector 50 will function just the same if these two components remain separate and operate independently after being combined together.

The resiliency of the outer shell body 51 provides many benefits, because the outer shell body 51 can be constructed of a pliable elastomer that can stretch under a load. Thus, because of such stretchability or flexibility of shell body 51, the central ingress and egress apertures (97, 99) can expand in size so as to fit tightly against whatever size, shape, type or gauge wire cable 58 may pass therethrough, there being no need to keep numerous connectors on hand depending on the wire gauge employed. For instance, the connector 50 readily accepts both oval and round non-metallic sheathed cables with equal facility. Because of its expansion property, the central ingress and egress apertures (97, 99) may automatically seal around the wire cable 58 as they are expanded, thereby preventing moisture from passing along wire cable 58 and into the interior of the enclosure or box. Further, the pliability of shell body 51 not only helps connector 50 seal around the wire cable 58, but such flexibility also enables connector 50 to seal around the perimeter of the knock-out opening 56. Thus, connector 50 and more particularly shell body 51 provide a liquid-tight seal around both wire cable 58 and the knock-out in wall 52.

Figure 10:
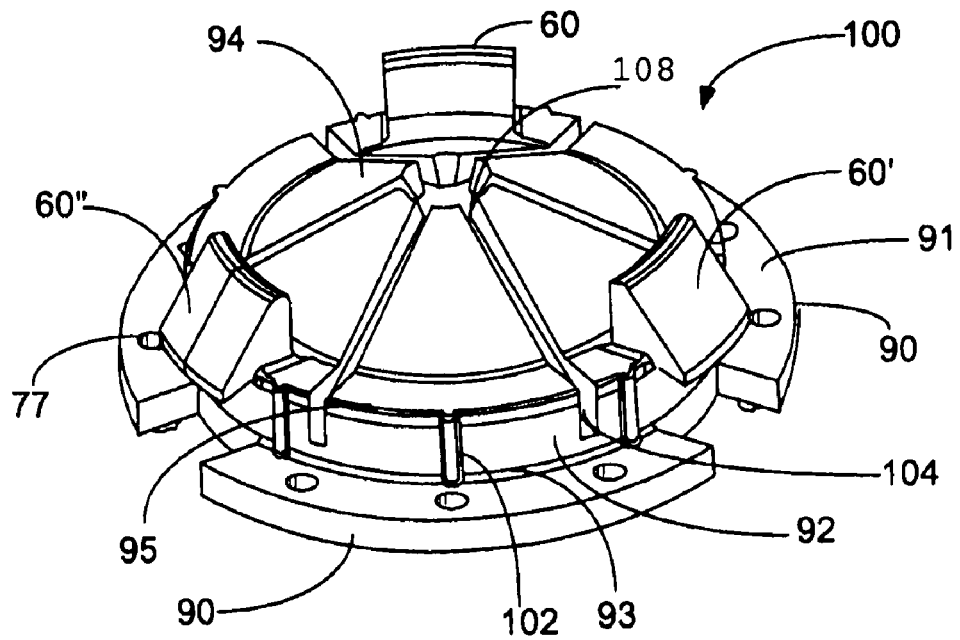
FIG. 10 is a perspective view of the exposed skeleton of the preferred embodiment of FIG. 7 with the over-mold removed.

Now referring to FIG. 10, the skeleton portion 100 shall be described. Structurally, the skeleton portion 100 can be generally an annular shape apparatus having an axially compact conic body with a set of short distanced upright side walls or cylindrical body 92 extending therefrom and a set of outwardly directed disjointed flanges 90 situated along most of its perimeter at its base. The side walls or cylindrical body 92 are preferably characterized by a bottom end 93 and a top end 95. The side walls or cylindrical body 92 extend almost fully around in a circumferential-hoop manner except at several disjointed slit sections 104 and includes protruding support columns 102.

Integrally formed with the top end 95, are preferably tabs 60, 60' and 60". Geometrically, the upright side walls or cylindrical body 92 adjoin the flange 90 at its inner circumference end or bottom end 93 and extend perpendicular to the flange 90. The frontal side of the flange 90 defines segmented abutment surfacing 91 thereabout that forms part of the seat that supports the elastomeric extension perimeter 83. Preferably, on the periphery of flange 90 may include several mold-through apertures 77 (nine apertures in this embodiment) to assist in tightly integrating the over-molded elastomeric structure over the skeleton portion 100. In addition, knobs 106 (twelve in this embodiment) can be provided on the bottom surface of the flange 90 to protrude out of the elastomeric structure for further integration of the two parts.

Figure 11:
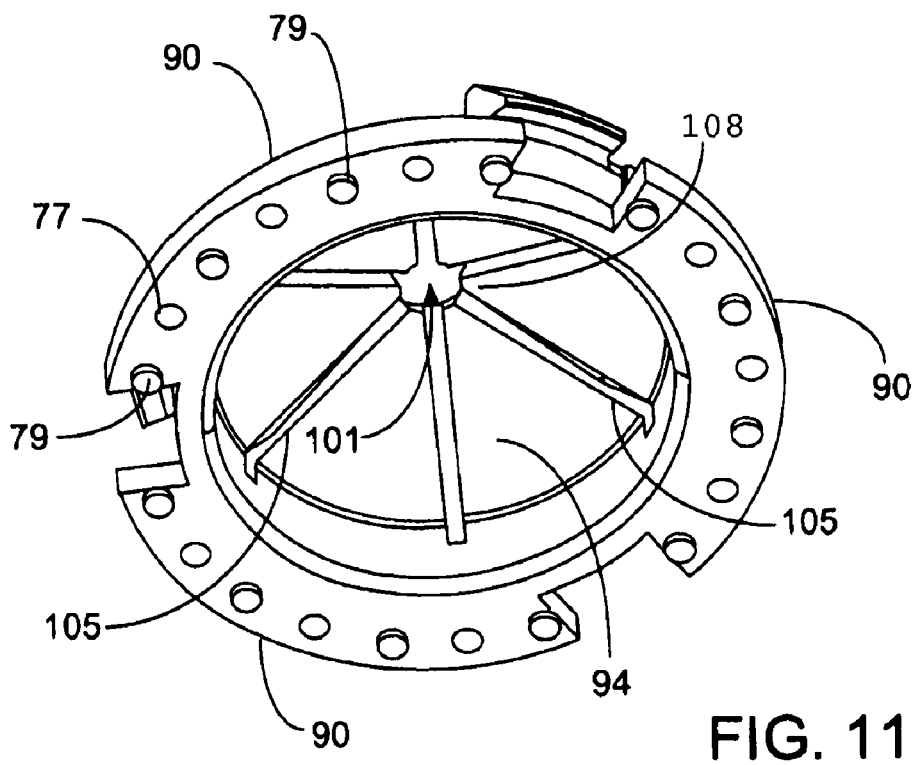
FIG. 11 is a bottom perspective view of the exposed skeleton of FIG. 7 of the present invention showing the opposite side of the device.

FIGS. 10 and 11 also illustrate the angular sector details of the axially compact conic body. As can be seen, the conic body of the skeleton portion 100 can be slit into several equal sized angular sectors 94. More particularly, each angular sector 94 may be separated from other angular sectors 94 starting from the tip or apex 108 to the intermediate region of the slit section 104. Because of this separation, each tip of the angular sector may, depending on the material of the skeleton profile and the length of the slits, flex radially outwardly all the way out parallel to the side walls or cylindrical body 92. Because the tip or apex of each finger can extend nearly to the very edge of the fitting, the invention can be used for both thick power cabling as well as thin data cabling. Also, because the angular sectors 94 are preferably directed towards the inside of the box 54 (i.e. in the direction of cable travel) this makes it easier to push the cable through and cable pull-out can be resisted better by the collet-like closing action of the angular sector 94 on the wire cable 58.

Additionally, the tip or apex 108 of each of the angular sectors 94 extends closer to the center and to each other, there being very little gap or circular spacing 101 between these tips 108. Therefore, each of the tips or apexes 108 form a tighter circle around the wire cable 58.

Because these angular sectors 94 are preferably compactly designed, the connector 50 can maintain the relatively thin profile. Further, as can be seen in FIG. 9, an intermediate-region 105 of each angular sector 94 can be slightly reduced in thickness, so that the angular sectors 94 can flex at a mid-region and not at its base or its tip.

The connector 50 according to the present invention has a much broader cable range than the device of current state of art. The connector 50 can be used for both thick power cabling and thin data cabling as well as any other profile cabling such as a flat cross-sectional cabling. This can be because in the connector 50, the tip or apex 108 of each angular sector 94 extends nearly to the very center of the gap, fitting circular spacing 101. There is usually only a tiny center circle 101 made of the over-molded material that is removed from the connector 50. Hence, any cable larger than this over-molded center will cause the perimeter of this opening to stretch around the wire cable 58 as well as cause the angular sectors 94 to flex.

These angular sectors 94 and more particularly distal ends of the sectors, referred to herein as the tips or apexes 108 may deflect when wire cable 58 is pushed through wire passageway 98. The tips or apexes 108 have a more pin-point interaction with wire cable 58 than curved edges, but nevertheless, angular sectors 94 likewise become wedged against the insulation of the wire cable 58 and the holding power of the connector 50 within wall 52 can be increased while providing strain relief, when an attempt is made to pull wire cable 58 back out of connector 50. These angular sectors 94 can also apply a direct linear force to the wire cable 58 with such force also having an axial component thereto.

The combination of these improvements can provide several benefits. As can be seen, no additional parts such as gland nut or locknut is required to secure and seal wire cable 58 within the wall 52 via button connector 50. Also, several features including the liquid-tight sealing around the wire cable 58, the greater holding power of the connector within the wall 52, and the strain relief for the wire, all are provided automatically upon the insertion of wire cable 58 into and through wire passageway 98 without requiring any secondary operation or installation step which would prolong the installation process. Furthermore, the initial insertion of connector 50 within the wall 52 further creates a seal around the enclosure opening or knock-out opening 56. Connector 50 also permits quick and easy installation and it does not have any component that requires field assembly or which project excessively from either side of the wall 52. Instead, connector 50 can be just slightly larger than the knock-out opening 56 itself. Further, while connector 50 comprises an outer shell body 51 and an inner skeleton portion 100, their assembly occurs at the factory and not in the field. Hence a single assembled connector 50 can be employed by the installer who simply snaps the connector 50 into an opening in the wall 52. No tools are required to install the connector 50 which also greatly simplifies this process.

Despite the higher cable retention properties of the current invention, the connector 50 can be removed from the cable and hence are re-usable (such as when a new cable is to be pushed through the box opening). To remove the connector 50 that is already installed, the user would skew or pivot the cable 58 so that it projects outward from the connector 50 at a 450 or less degree angle rather than at its normal 90°. This will cause the angular sectors 94 to be mis-aligned with each other and hence enable the cable 58 to slide off the connector 50, and its removal from the wall thereafter.

The resiliently flexible outer shell body 51 and the slits 104 on the sidewall or cylindrical body 92 accommodate its flexing radially of axis 110. This, in turn, facilitates the snap fitting of the connector to the box. It also permits the connector 50 to be applicable to a wide range of knock-out hole tolerances. In other words, with the design of the invention, the knock-out opening 56 to be made in the box 54 can be a non-standard opening. A typical ¾ inch fitting actually requires a larger diameter knockout opening 56. Same with a typical ½" fitting, it requires a larger than ½" hole or knock-out opening 56. Thus, with the current invention, the installer can actually drill a ¾ inch knockout opening 56 for a ¾ inch fitting.

Further, the connector 50 can be used as both a cable fitting as well as a plug. When used as a fitting, the cable 58 will extend through the connector 50 into the box. However, when the connector 50 has not yet been pierced by cabling, its seal (thin elastomer or similar membrane) remains intact and hence can be used as a plug to seal an unused knockout opening 56. This inventive feature of the present invention can be also due to the connector 50 having a configuration of only a single wall whereas the device according to the current state of art requires two walls, thus forming a containment space therein.

The skeleton flange 90 as shown in FIGS. 9 through 11 acts as a stop measure, preventing connector 50 from being pushed completely through the wall opening or knockout opening 56. The outer surface of tabs 60, 60', and 60" can be inclined to ease its insertion through the opening or knockout opening 56. The skeleton portion 100 can be made of semi-rigid to rigid material and extend across nearly the full diameter of shell body 51. Such skeleton portion 100 can be shown as being arch-shaped so as to provide support and impart a domed or button shape to shell body 51. Other shapes for skeleton portion 100 are equally likely, such as flat or even slightly concave. By its construction, skeleton portion 100 transfers any wire withdrawal force from wire cable 58 itself through skeleton portion 100 and to wall 52. This force transfer helps retain connector 50 within the knock-out or wall opening 56 by compressing wall 52 even more so via tab 60 and flange 90.

A seat 76 can be defined as the spacing between the elastomeric extension perimeter 83 of the tail side 80 and the outer perimeter 75 of the pointed head 71 together (Seen in FIG. 9). In essence, the connector 50 sandwiches the perimeter 57 of the knock-out opening 56 in the wall 52 between the set of tabs 60, 60', and 60" on one side and the over-molded elastomeric extension perimeter 83 extending from the flange 90 on the other.

The enclosure or box 54 may be a typical electrical outlet box or a load center. The knock-out opening 56 can be formed in a molded box 54 which itself may be fabricated with plastic, metal, sheetrock, or any other suitable materials in any manner usual and customary for a molded box or a wall with knock-out openings 56. While the box 54 may be of the molded plastic type, the invention is equally applicable to non-molded boxes, and specifically to the outlet openings of metal boxes as formed in any usual and customary manner for metal boxes. In essence, connector 50 helps isolate wire cable 58 from the sharp edges of the perimeter 57 of the knock-out opening 56, thereby preventing the wire's insulation from being scraped off or otherwise removed during wire insertion and/or pulling while maintaining an inner box environment that can be contaminant free.

As can be seen, the cord of the wire cable 58 extends through the connector 50 positioned within the knock-out 56 in the typical fashion. Wire cable 58 is preferably a non-metallic sheathed cable but other cables are equally suitable for use with the connector 50. Also, while the above is described with respect to skeleton portion 100 being internal the outer shell 51, connector 50 could also be constructed with skeleton portion 100 being external to the outer shell 51. More importantly, the connector 50 can be pushed into the knock-out opening 56 from a side facing the installer through a knock-out opening 56 in the wall 52 in a normal fashion.

Alternative designs are shown in FIGS. 12 through 19. In another particular embodiment, with reference to FIGS. 12 through 15, the connector 50' may be designed with a substantially circular body 64. The circular body 64 may include an inverted mushroom-shape with a top circular side or insertion side portion 70 of a particular diameter 74 and a sloping or a curvilinear surface 66. The body 64 may also include a bottom frusto-conic surfaced side or tail side 80 with a larger outermost diameter 82. The surface 66 on the top or insertion side portion 70 may include an upper circumferential ridge 72 from which the outer surface 73 slopes downward a short distance toward the outer perimeter 75. Although the ridge 72 may be located near the wire passageway 98 in a sloping manner, it is foreseeable to design the sloping surface 66 such that the ridge may be located midway between the wire passageway 98 and the outer perimeter 75. From the outer perimeter 75, a side stem wall 78 can be provided parallel to the central axis 110.

In the alternative design, the inner middle surface 120 may be provided on top of the circular insertion side portion 70 which slopes downward but in a slightly curvilinear manner toward the passageway position or the center aperture location for the wire passageway 98. The center aperture location, or wire passageway 98, may be provided with a ready-made small hole or it may also be formed with a thin elastomer membrane for a cable tip 59 to bore through with minimal resistance.

Although the sloping surface 66 may be undivided, it is foreseeable to provide a plurality of sectorial angular jaw sections 62 starting from the upper ridge 72 of the insertion side portion 70. The inner surface 120 can be further defined by the set of opposed angular jaw sections 62 projecting inwardly toward the center location or wire passageway 98, wherein each jaw can be separated from each other jaw by a slit 104, which may be covered by a thin layer of elastomeric membrane.

The set of angular jaw sections 62 can be arranged concentrically about the central axis 110 of the substantially circular body 64 with each comprising a collet finger 116 including a base 67 and a jaw head 68 to form a self acting collet 69 for receiving the end 59 of the non-metallic sheathed cable 58 that is to be applied to the box 54, and hold same against withdrawal from the box 54, as will be described hereinafter.

The outer perimeter 75 can define curvilinearly contoured surfaces for cooperation with the box wall margin or perimeter 57 in applying the connector to the box outlet opening 56, as will be described hereinafter.

The circumferential periphery 73 of the upper ridge 72 may be interrupted by a set of triangular wedge-shaped tabs 60 and 60'. Each tab (60 and 60') may include a gap interval 63 between either ends 77, 77' for ease of molding during manufacturing process. Each tab 60, or 60' can be over-molded on the bottom by a unitary column of abutting stem wall 61. Both the tab 60 and the abutting stem wall 61 delineate from the upper ridge 72 and rest of the stem wall 78 to allow separate flexible movement of the tabs 60, 60' when being inserted into the opening 56 while the outer perimeter 75 remains constant.

Figure 13:
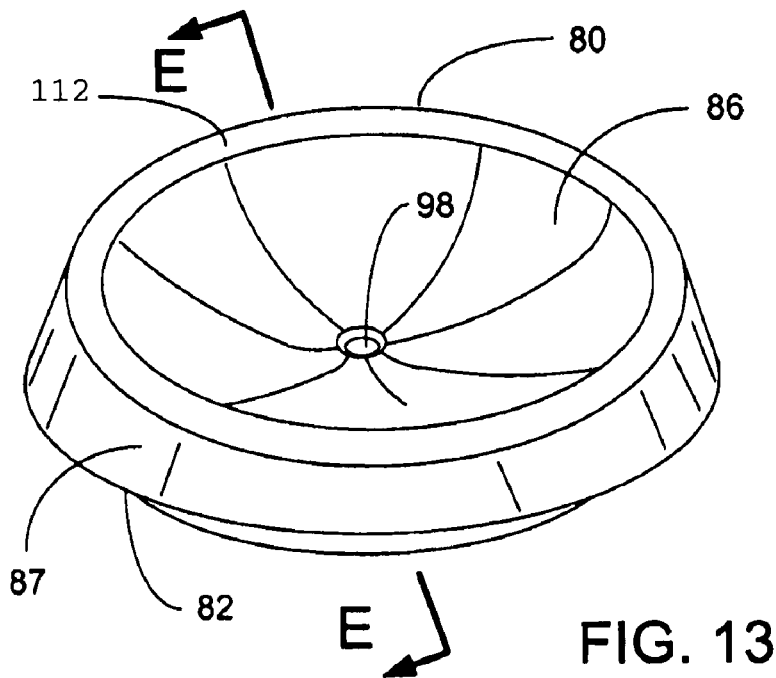
FIG. 13 is a perspective view showing the opposite side of the device as shown in FIG. 12.

Referring now to FIG. 13, the bottom frusto-conic surfaced side or tail side 80 is shown. The tail side 80 of the shell body 51 can be of plain annular configuration and faces away from the set of angular jaw sections 62. Similar to the top circular side or insertion side portion 70, the bottom frusto-conic surfaced side or tail side 80 also includes a lower circumferential ledge 112 defining a berm-like shoulder shape with an outer sloped surface 87 extending downward a short distance toward the outmost diameter 82. The interior sloped surface 86 slopes in a curvilinear manner toward the opposite side of the center aperture location or central axis 110, namely the cable ingress passageway position 97.

The outermost diameter 82 of the bottom frusto-conic surfaced side or tail side 80 and the outer perimeter 75 of the top circular side or insertion side portion 70 together can define a seat 76 (Seen in FIG. 14) in between which the box wall rim portion or perimeter 57 that defines the outlet opening or knockout opening 56 can be received to mount the connector 50 in the box 54, and specifically in its outlet opening or knockout opening 56.

Structurally, the skeleton portion 100 is generally a ring shape apparatus having a set of short distanced upright side walls or cylindrical body 92. The side walls or cylindrical body 92 are preferably characterized by a bottom end 93 and a top end 95 and the walls or cylindrical body 92 extend almost fully around in a circumferential manner except at the two disjointed sections of tab supporting walls 96 and 96'. Adjacent to the top end 95, and supported by the tab supporting walls 96 and 96', are preferably two tabs 60 and 60'. Furthermore, the bottom end 93 has an outwardly directed flange 90 situated along most of its perimeter. Geometrically, the upright walls or cylindrical body 92 adjoin the flange 90 at its inner circumference and the upright walls or cylindrical body 92 extend perpendicular to the flange 90. The body side of the flange 90 defines segmented abutment surfacing 91 thereabout that forms part of seat that abuts against the outside surface of the box wall 52 when the connector 50 can be applied to the box 54. The periphery of flange 90 include several apertures 77 to assist in integrating the over-molded elastomeric structure over the skeleton portion 100.

Figure 14:
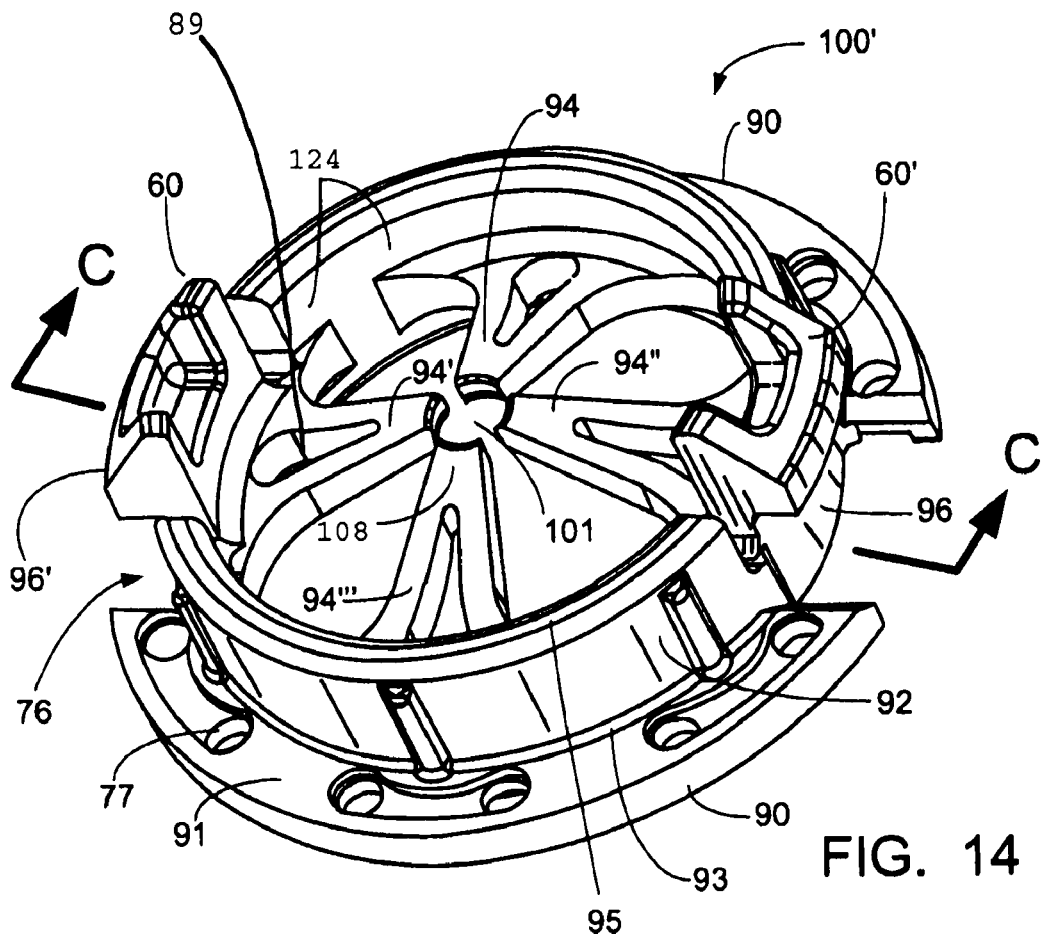
FIG. 14 is a perspective view of the exposed skeleton of FIG. 12 with the over-mold removed.
Figure 15:
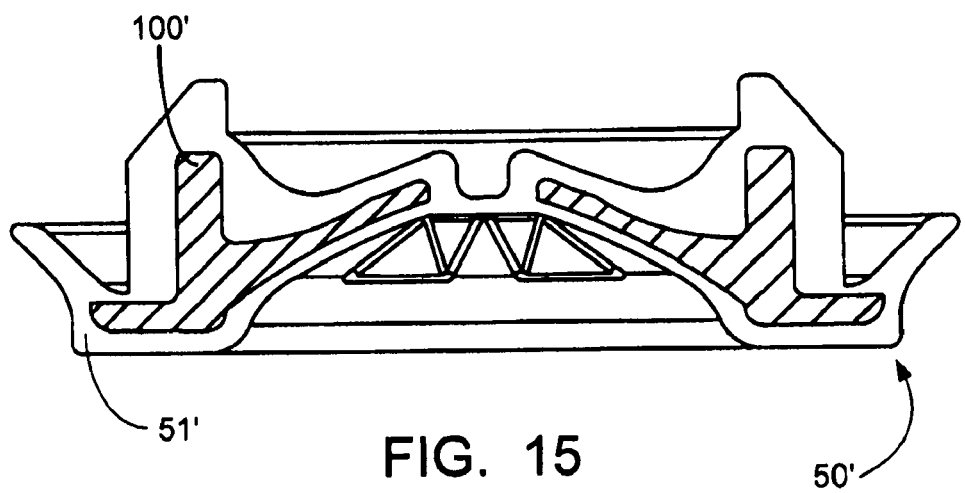
FIG. 15 is a cross-sectional view of the exposed skeleton of FIG. 12 of the present invention, with the view taken along lines C-C of FIG. 14.

FIG. 14 illustrates an inner finger type design for the above-mentioned collet function with this finger design incorporating a plurality of fingers 94, 94', 94", and 94'" having tips or apex 108 bordering wire passageway 98. In essence, at the interior side 124 of the side wall or cylindrical body 92, at or near the bottom end 93 are preferably four inwardly directed fingers 94, 94', 94", and 94'" curved upwardly away from the flange 90. Because the fingers 94, 94', 94", and 94'" are preferably angled towards the inside of the box 54 (i.e. in the direction of cable travel) this makes it easier to push the cable through. Also, because the fingers 94, 94', 94", and 94'" are preferably curved inwardly, not outwardly, cable pull-out can be resisted better by the design.

Also, these fingers 94, 94', 94", and 94'" extend from a mid-region of the side wall or cylindrical body 92, or from the region of the wall closest to the flange 90, not from the wall's distal top end. Because the fingers extend inwardly from a mid-region of the wall or cylindrical body 92, and the wall does not extend as much as the wall catches do, this configuration leads to the connector device 50 having a low profile. Additionally, the tips or apex 108 of the fingers 94, 94', 94", and 94'" extend closer to the center and to each other, there being very little gap 101 between these tips. Therefore, the tips 108 form a tighter circle between them. Further, a mid-region of each finger 94, 94', 94", and 94'" can be slightly reduced in thickness (as can be readily seen in FIG. 15) and/or each finger can be perforated with perforations 89 so that the fingers 94, 94', 94", and 94'" will flex at a mid-region and not at its base. As a result, the angular jaw sections 62 flex from a mid-region, not from their base, this being accomplished via the reduced thickness or perforations of the mid-region of the fingers as mentioned above.

These fingers 94, 94', 94", and 94''' and more particularly distal ends or, the tips or apexes 108 are preferably deflected when wire cable 58 is pushed through circular spacing 101 to wire passageway 98. Distal ends, referring to the tips or apexes 108 have a more pin-point interaction with wire cable 58 than curved edges above, but nevertheless, fingers 94, 94', 94", and 94''' likewise become wedged against the outside of wire cable 58 when an attempt is made to pull wire cable 58 back out of connector 50. The gap or the circular spacing 101 between fingers 94, 94', 94", and 94''' permit them to flex as needed. These fingers 94, 94', 94", and 94''' also apply what might be said to be a direct linear force to wire cable 58 with such force also having an axial component thereto. As indicated above with respect to the vortex design, the act of inserting wire cable 58 within passageway 98, and particularly any attempted removal therefrom, causes greater holding power of connector 50 within wall 52 as well as strain relief properties for wire cable 58.

Figure 12:
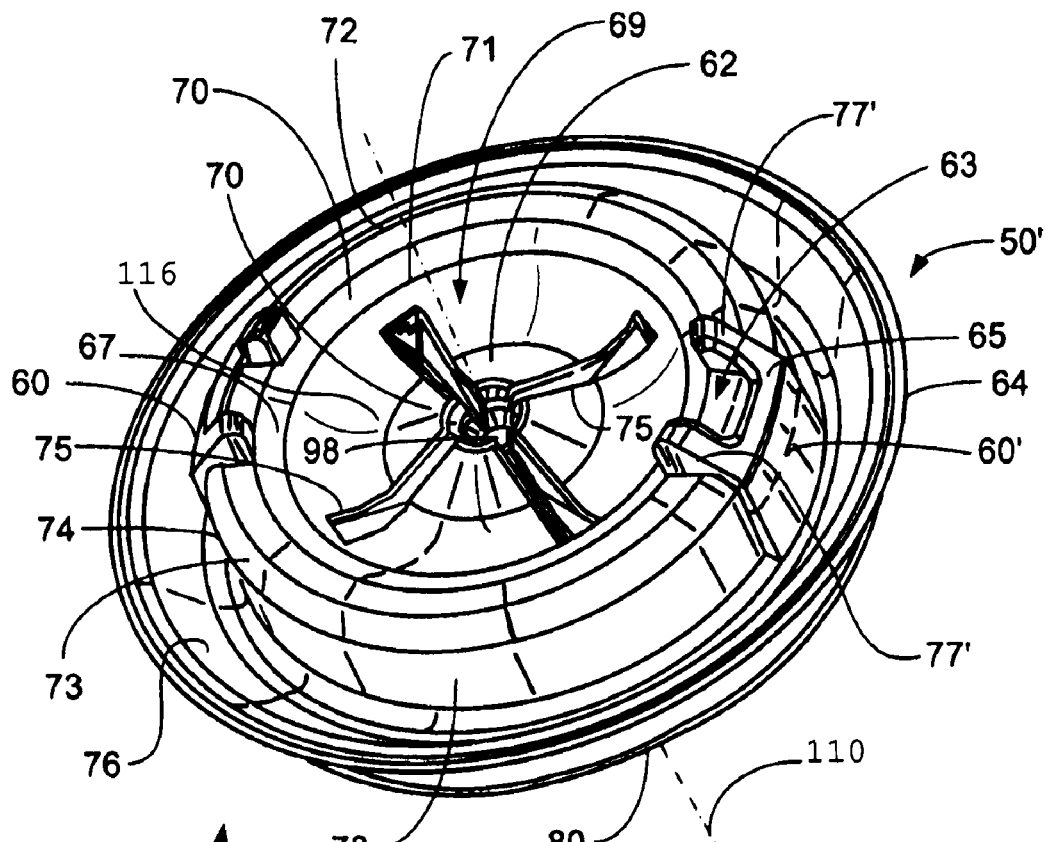
FIG. 12 is a cross sectional view of another embodiment of the present invention.

The circular body 64 can be formed with a plurality of over-molded marginal slots 118, with the respective slots 118 and their thin elastomer membrane, extending substantially perpendicular to the axis 110 of the connector 50, longitudinally thereof, and each slot being centered on the respective angular jaw sections 62 (see FIG. 12). Slots 118 are preferably of sufficient depth, radially of central axis 110, to subdivide angular jaw sections 62 of the body 64 into segments for flexibility and extend substantially into jaw heads 68.

Returning to the skeleton portion 100', the fingers 94, 94', 94", and 94''' are preferably separated by cross spaces 87, which thus define the sides of the respective fingers 94, 94', 94", and 94'''. While the fingers 94, 94', 94", and 94''' are preferably subdivided by the respective slots 118 when over-molded, the resulting angular jaw sections 62 are preferably integral with the body segments 64 adjacent same, so that connector 50 can be of one piece construction.

FIGS. 16-20 illustrate that various other configurations of skeleton portion 100' with other shapes are equally possible to provide the features of the invention. In each of them, skeleton portion 100' can be configured with a central wire passageway 98 therethrough which aligns with that in shell body 64'. In some instances, tabs 122 and flange 90' form a part of skeleton 100' while in others, they form a part of shell 64'. Also, skeleton portion 100' can be configured with a deflectable surface 85 which engages and mechanically secures the wire cable 58 in wire passageway 98'. This surface 85 also prevents such wire cable 58 from being pull back out through wire passageway 98'.

Figure 16:
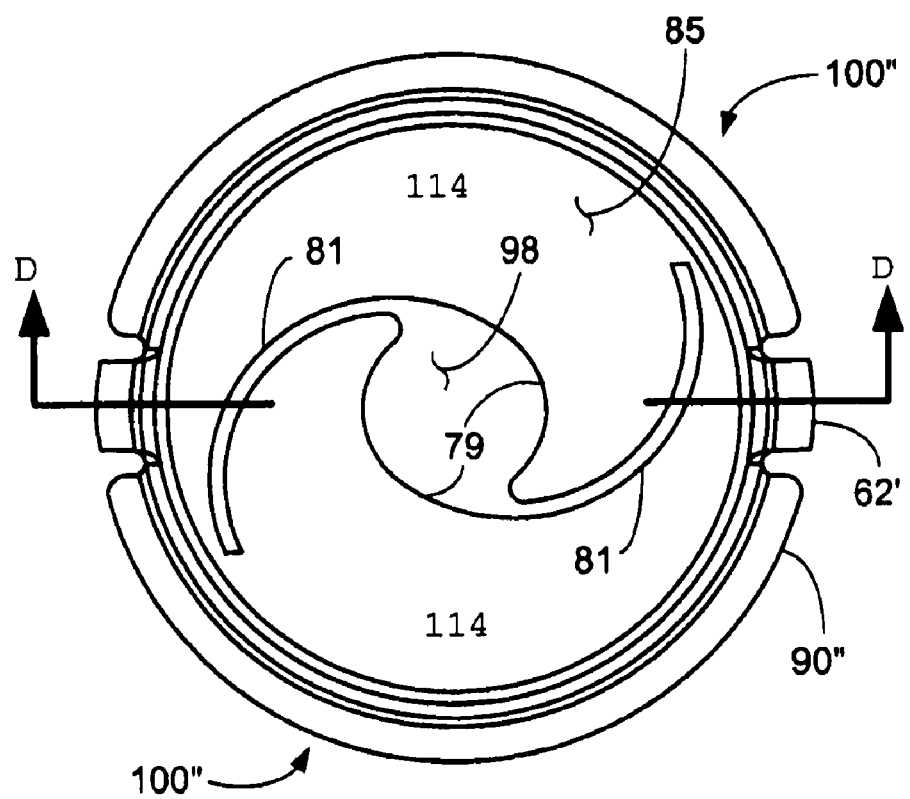
FIG. 16 is a top plan view of another embodiment of the present invention.
Figure 17:
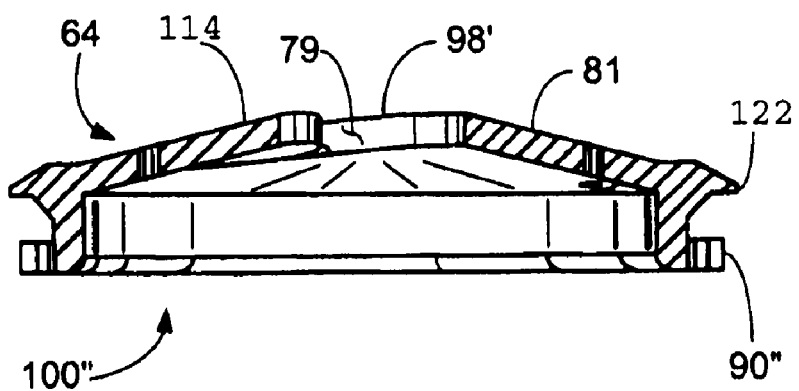
FIG. 17 is a cross sectional view of the embodiment shown in FIG. 16 taken along the lines D-D of FIG. 16.

FIGS. 16 and 17 illustrate a vortex type design for surface 85 with this vortex design incorporating two flexible flaps 114 bordering wire passageway 98'. Curved edges 79 are preferably located along the border of wire passageway 98' and are preferably designed to surround at least a portion of the perimeter of wire cable 58. These flaps 114 and curved edges 79 are preferably deflected by the act of pushing wire cable 58 through wire passageway 98', such wire cable 58 expanding or enlarging the size of wire passageway 98'. Hence, flaps 114 and curved edges 79 become wedged or compress against such wire cable 58 when it can be pulled back in the opposite direction. Slits 104 aid in the deflection of flaps 114 thereby allowing them to grip wire cable 58 in such a manner. Flaps 114 impart what might be said to be both a radially inward force to wire cable 58 as well as an axial force. Also, any attempted removal of wire cable 58 from connector 50 can be resisted by now-deflected flaps 114 which would then be moved in compression. These flaps 114 transfer such withdrawal force to wall 52 thereby increasing even further the engagement of wall 52 with connector 50 as well as providing strain relief for wire cable 58.

Figure 18:
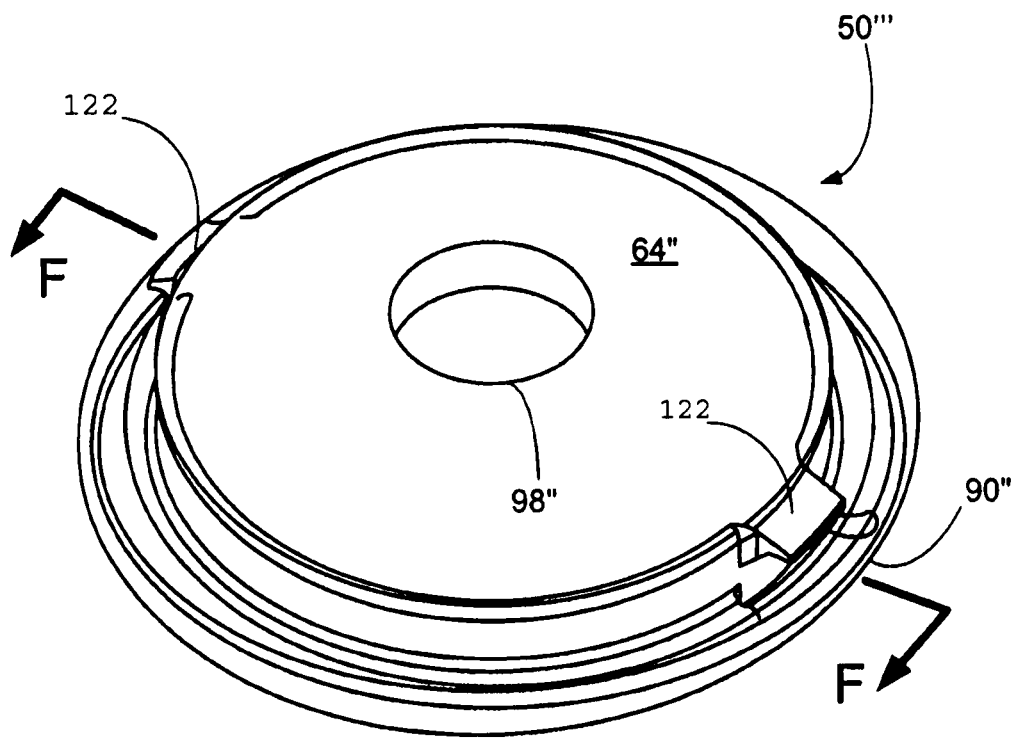
FIG. 18 is a perspective view of further another embodiment of the present invention.
Figure 19:
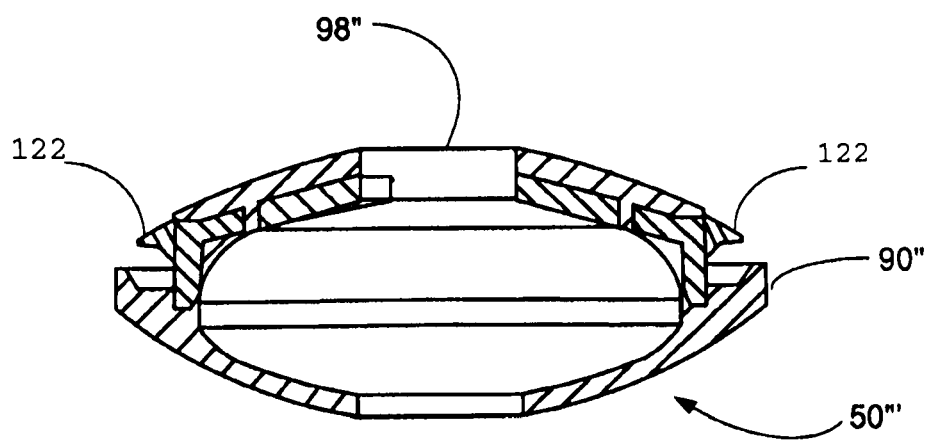
FIG. 19 is a cross sectional view of the embodiment shown in FIG. 18 taken along the lines F-F of FIG. 18.

FIGS. 18 to 19 discloses a further embodiment of the connector 50" invention with a circular shell body 64" and a set of tabs 62". This particular embodiment has been provided with an opening 98" and can be double walled in contrast to the other embodiments discussed previously.

Figure 20:
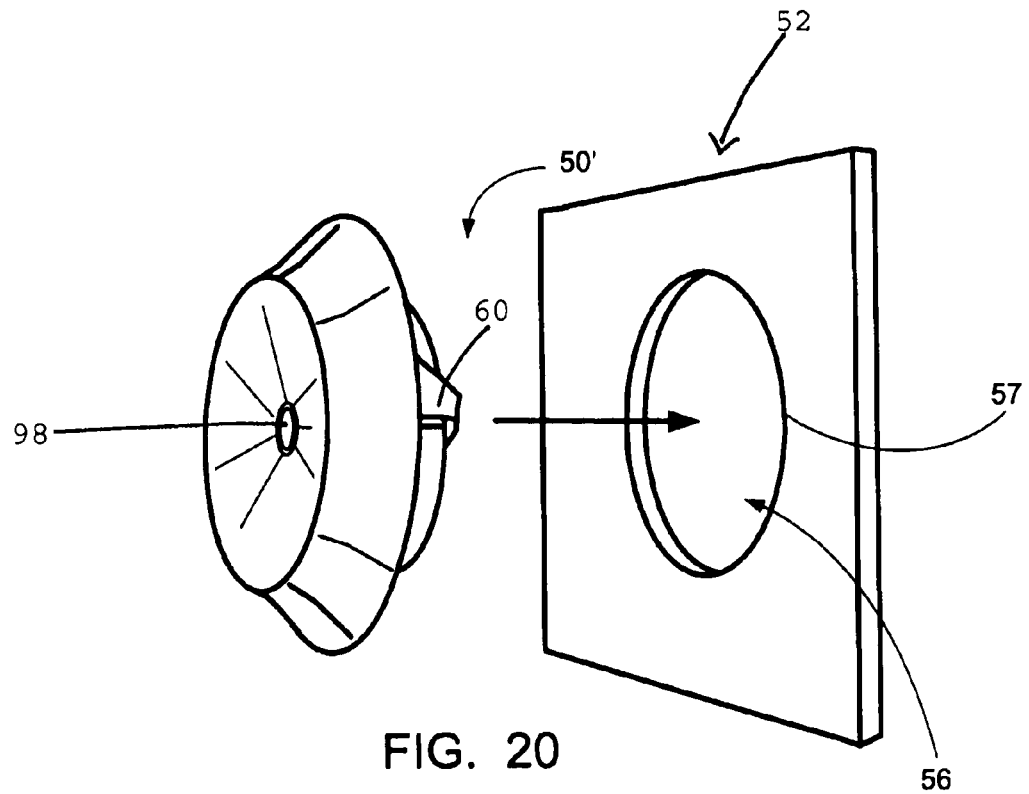
FIG. 20 is a graphical illustration showing the first step of the present invention embodiment being installed.
Figure 21:
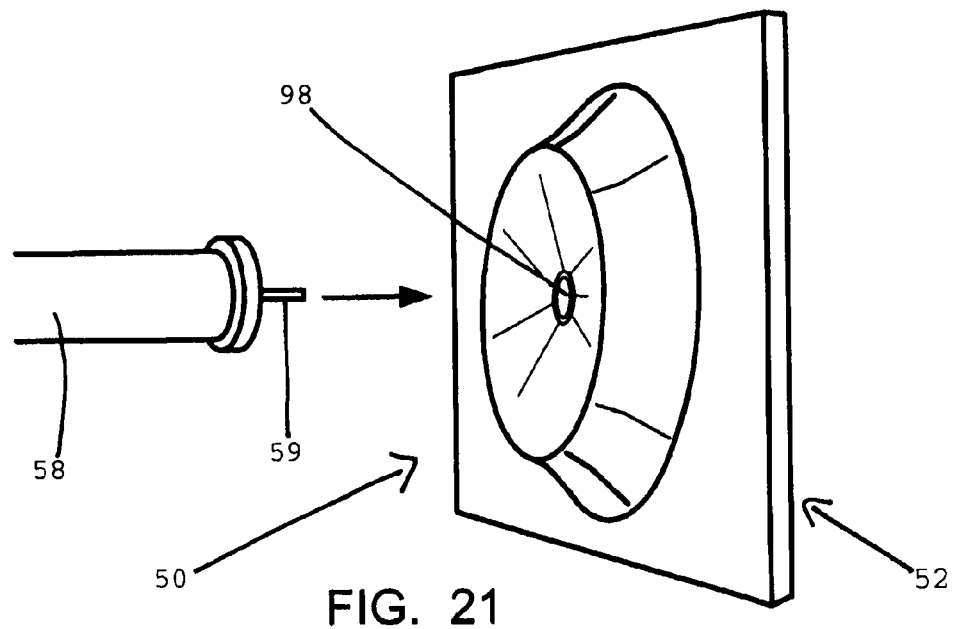
FIG. 21 is a graphical illustration showing the next step of installing the present invention embodiment.

Having described the structure of different embodiments, the inventive method of utilizing a particular embodiment shall be described with respect to FIGS. 20 to 21. Although the drawing figures utilize the second embodiment discussed above, a person of ordinary skill in the art will immediately recognize that the inventive method can be performed utilizing any embodiments discussed above or their equivalents thereof. As can be seen in FIG. 20, the connector 50' can be applied to the box 54, from the installer's side. The installer, first opens up the knock-out opening 56. He, then, takes the connector 50, centers its tabs 60 on the knock-out opening 56 with its cam surfaces 65 placed against the outer margin 57 of the knock-out opening 56. He presses the connector 50 inwardly of the box or to the right of FIG. 20. This, in turn, cams the tabs 60 toward each other sufficiently so that the connector 50 slips in a snap-in fashion into the wall 52. The outer margin wall 57, in essence, slips in between the connector seat 76 between the respective tab shoulders and body rim segments to seat the connector 50 in the knock-out opening 56.

After insertion, the body segments adjust radially of central axis 110 as needed by the relative size of the knock-out opening 56 to which the connector 50 is applied. Because the connector 50 can be formed partly from resiliently flexible material, the angular jaw sections 62 return under their built in resilient bias to the substantially normal positioning indicated in FIGS. 12 to 15.

The connector 50' in accordance with the invention can be adapted to be applied to the box knock-out opening 56 without using any special tools, and normally finger pressing acting on the body, and specifically against its side, can be adequate to effect mounting of the connector in the box. This may be facilitated when necessary by a light tapping action on the side of body member with a hammer where the sizing of the knock-out opening is somewhat smaller than will accommodate finger pressure application of the connector to the box knock-out opening 56.

The next step involves inserting a cable into the wire passageway 98. Assuming that the end of a length of non-metallic sheathed cable 58 is rigid enough to be applied to the box 54 through the connector 50, the installer grasps the cable 58 adjacent the cable end 59, and presses the cable end 59 against the inside cam surfacing of angular jaw sections 62. This insertion forces the section 62 apart to receive and pass the cable end 59.

The narrow side edges of the cable 58 will be lodged in and be engaged by the respective gripping edges of angular jaw sections 62. By pressing the cable end 59 inwardly of the box 54, the angular jaw sections 62 are preferably cammed to the respective spread apart positions to accommodate ready sliding movement of the cable 58 inwardly of the box 54 with respect to the connector 50.

The angular jaw sections 62 are preferably arranged so the cable end 59 may be inserted through connector 50 in any other position of orientation, relative to angular jaw sections 62, about axis 110. In this manner, some combination of the rim portions, and their gripping edges, of angular jaw sections 62 will provide the resilient gripping and withdrawal movement preventing action referred to, without penetrating the cable sheathing.

As long as the cable 58 can be inserted to the right of FIG. 21, the cable will move smoothly into the box through the connector 50 due to the cam follower type sliding action that the jaw sections 62 have on the cable sheathing. When the insertion movement stops, the angular jaw sections 62 will remain somewhat spread apart from the positioning indicated in FIGS. 12 to 15, with the angular jaw sections 62, and specifically their rim portions, bearing with light pressure on the cable sheathing. The non-metallic nature of the jaw rim portions and the bluntness of their gripping edges avoids risk of actual severing of the sheathing surface.

Thus, when wire cable 58 can be first pushed through wire passageway 98 in FIG. 21, it expands wire passageway 98 and deflects its outer surface. An opposite reactive force is thus generated in skeleton portion 100 which transfers this insertion force to wall 52 thereby resulting in firmer engagement of connector 50 with wall 52. Consequently, upon the insertion of wire cable 58, a greater force upon tabs 60 and flange 90 against wall 58 occurs than normally exists when no wire cable 58 extends through wire passageway 98.

Once the connector 50' is in place, the installer can reuse or reposition the connector 50' by removing the cable in a skewing manner. The installer would simply skew or pivot the cable on the connector 50' on the connector 50' so that the cable projects outward from the connector at a 45 or less degree angle rather than at its normal 90 degrees. Then, the installer can slide the cable off the connector once the fingers are mis-aligned with each other. Finally, the connector can be removed simply by providing a force on the tabs.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention. Various changes to the foregoing described and shown structures would now be evident to those skilled in the art. Accordingly, the particularly disclosed scope of the invention is set forth in the following claims.

What is claimed is:

1. A cord connector comprising:
   (a) a pliable shell having a wire passageway therethrough;
   (b) a rigid skeleton adjoining said pliable shell and sharing said wire passageway therethrough with said pliable shell, said rigid skeleton having a flange configured to retain against a wall opening said rigid skeleton having perimetrical side wall and a plurality of deflectable appendages which are deflected by the passage of a wire through said wire passageway, said rigid skeleton supporting said pliable shell with flexible resistance such that said deflectable appendages cooperate with said pliable shell to further restrict the removal of the wire back through said wire passageway; and
   (c) whereby said pliable shell and said deflectable appendages cooperate to provide a seal around said wire and also to provide strain relief to said wire in said wire passageway.

2. A cord connector as set forth in claim 1 further comprising at least one tab spaced from a flange wherein said tab is deflectable so as to be pushed through said wall opening and wherein said flange prevents the further movement of the connector through the wall opening.

3. A cord connector as set forth in claim 2 wherein at least one said tab or said flange form a part of said skeleton.

4. A cord connector as set forth in claim 2 wherein at least one said tab or said flange form a part of said pliable shell.

5. A cord connector as set forth in claim 1 wherein said deflectable appendages comprise a plurality of inwardly directed fingers having distal ends that are deflected by the insertion of a wire through the connector.

6. A cord connector as set forth in claim 1 wherein said deflectable appendages comprise at least one curved edge arranged around the boundary of said wire passageway, said curved edge and said deflectable appendages being deflected by the insertion of a wire through the connector.

7. A cord connector according to claim 1, wherein said pliable shell further comprises a center portion which is a thin elastomer membrane configured to plug the wall opening until pierced by said wire such that the cord connector remains contaminant-free when in said wall opening without said wire in said wire passageway.

8. A cord connector according to claim 1, further wherein said the pliable shell is selected from a material having properties selected from the group consisting of: a resilient flexibility, a self-lubricating quality, a dielectric quality, corrosion resistant, non-metallic, and combinations thereof.

9. A cord connector according to claim 1, wherein the cord connector has a low profile that eliminates any chances of interference.

10. A cord connector according to claim 7, wherein said center portion of said pliable shell and said deflectable appendages are resiliently flexible to sealably accommodate and retain a variety of different cord gauges.

11. A cord connector according to claim 1, wherein the cord connector is sized slightly bigger than the wall opening into which the cord connector will fit so as to allow engagement with a non-standard opening size.

12. A cord connector according to claim 5 further wherein said inwardly directed fingers are curved upwardly away from said flange to make it easier to push the wire through and provide a high cable retention force further preventing removal of the cable wire once inserted.

13. A cord connector according to claim 1, wherein said wire is releasable from said deflectable appendages of said rigid skeleton and said pliable shell by an angular release.

14. A cord connector according to claim 1, wherein said inwardly directed fingers extend from a mid-region of an end of said perimetrical side wall of said rigid skeleton or from a region of said perimetrical side wall closest to said flange to provide a stronger support and result in a low profile for the cord connector.

15. A cord connector according to claim 1, wherein said deflectable appendages are a plurality of angular sectors configured to conically extend substantially close to said center portion and substantially close to each other to allow insertion of a wide range of different wire shapes and gauges as a thick power cabling as well as a thin data cabling.

16. A cord connector according to claim 1, wherein said deflectable appendages are of non-uniform thickness in a mid-region that is reduced in thickness compared to the remaining portion of the deflectable appendage, so that said deflectable appendage will flex at a mid-region and not at each deflectable appendage base.

17. A cord connector according to claim 1, wherein each of said pair of inwardly directed fingers is perforated so that each of said fingers will flex at a mid-region and not at a base of each finger.

18. A cord connector according to claim 1, wherein the cord connector assembly is pivotedly removable from said pliable shell and said deflectable appendages of said rigid skeleton upon the wire projecting from the cord connector at about 45 degrees or less.

19. A cord connector according to claim 1, wherein said wire is sealably restrained in the wire passageway when the wire is pivoted at an angle greater than about 45 degrees.

20. A cord connector according to claim 1, wherein said flange has apertures to engage with said pliable shell.

21. A cord connector according to claim 1, wherein the cord connector is configured to push onto and retain in said wall opening from the wire insertion side of the wall by a plurality of releasable tabs located on said rigid skeleton.

22. A cord connector as set forth in claim 1 wherein said inwardly directed fingers are capable of flexible resiliency to accommodate and retain repetitive insertion of various sized wires.

23. A cord connector as set forth in claim 1 wherein said wire passageway and said perimetrical side wall of said rigid skeleton are lined with said pliable shell to promote a liquid-tight seal throughout the wire passageway.

24. A cord connector assembly comprising:
    a rigid skeleton part characterized by a circumferential hoop with a perimeter, said skeleton part including an outer flange, at least a plurality of inwardly jutting pronged cable supports adjacent said perimeter, and at least a radially outwardly protruding tab on said perimeter; and
    a pliable shell over-molded around at least a portion of said rigid skeleton part, said pliable shell having a center portion shaped to allow passage of a wire and provide strain relief to the cable wire while sealing the wire passageway and a wall opening to prevent passage of contaminants, wherein said protruding tab is configured to be pressed through said wall opening, said pliable shell overmolded onto a plurality of inwardly jutting pronged cable supports to create a center portion as the only support layer to imparting direct force on the wire.

25. A cord connector assembly according to claim 24, wherein said center portion is a thin elastomer membrane which further comprises a plug in the wall opening to seal the wall opening from contaminants until pierced by a wire.

26. A cord connector assembly according to claim 24, wherein said strain relief and sealing characteristics defined by passage prevention of contaminants automatically occur upon the cable insertion and do not require any secondary operation or installation step.

27. A cord connector assembly according to claim 24, wherein the cord connector assembly has a non-interfering profile in said wall opening.

28. A cord connector assembly according to claim 24, wherein said center portion is configured to resiliently flex and expand to accommodate a variety of different cord gauges.

29. A cord connector assembly according to claim 24, wherein the cord connector assembly is sized slightly bigger than the wall opening into which the cord connector assembly will fit so as to allow engagement with a non-standard opening size.

30. A cord connector assembly according to claim 24, wherein said plurality of inwardly jutting pronged cable supports are curved upwardly away from said flange to make it easier to push the wire through and provide a high cable retention force further preventing removal of the wire once inserted.

31. A cord connector assembly according to claim 24, wherein said plurality of inwardly jutting pronged cable supports extend from a mid-region of said end of said hoop, or from a region of said hoop closest to said flange to provide a stronger support and result in a low profile for the cord connector assembly.

32. A cord connector assembly according to claim 24, wherein said plurality of inwardly jutting pronged cable supports extend substantially close to said center portion and substantially close to each other to allow insertion of a wide range of different wire shapes and gauges as a thick power cabling as well as a thin data cabling.

33. A cord connector assembly according to claim 24, wherein said plurality of inwardly jutting pronged cable supports includes an intermediate region that is slightly reduced in thickness, so that said support will flex at a mid-region and not at its base.

34. A cord connector assembly according to claim 24, wherein each of said plurality of inwardly jutting pronged cable supports is perforated so that said support will flex at a mid-region and not at its base.

35. A cord connector assembly according to claim 24, wherein the inserted cable wire is pivoted against the cord connector assembly so that the wire projects outward from the cord connector assembly at a 45 or less degree angle rather than at its normal 90 degrees, causing said plurality of inwardly jutting cable supports to be mis-aligned with each other and enable the cable to be slid off of the cord connector assembly.

36. A cord connector assembly according to claim 24, wherein the wire is retained in said wire passageway by said plurality of inwardly jutting cable supports when the wire is pivoted at an angle greater than about 45 degrees.

37. A cord connector assembly according to claim 24, wherein said flange has apertures to engage with said pliable shell.

38. A cord connector assembly according to claim 24, wherein the cord connector assembly is made to plug into the wall opening in the same direction as the wire.

39. A cord connector assembly as set forth in claim 24, wherein said inwardly jutting pronged cable supports comprise a plurality of inwardly directed fingers having distal ends that are deflected by the insertion of the wire through the cord connector assembly.

40. A cord connector assembly as set forth in claim 24, wherein said inwardly jutting pronged cable supports comprise at least one curved edge arranged around the boundary of said wire passageway, said curved edge and said cable supports being deflected by the insertion of the wire through the cord connector assembly.

41. A cord connector assembly according to claim 24, further comprising at least one tab spaced from a flange wherein said tab is deflectable so as to be pushed through an opening and wherein said flange prevents the further movement of the connector through the opening.

42. A cord connector assembly according to claim 41, wherein at least one said tab or said flange form a part of said rigid skeleton.

43. A method of manipulating a connector for insertion into and removal out of a wall aperture for reusage of the connector, the method comprising:
    providing a connector comprising a rigid skeleton part characterized by a circumferential hoop, said skeleton part having an outwardly directed flange, at least a pair of inwardly jutting pronged cable supports, and at least a radially outwardly protruding tab on said hoop, at least a portion of said rigid skeleton part over-molded with a pliable shell, said pliable shell having a center portion shaped to allow passage of a cable wire and provide strain relief to the cable wire but prevent passage of contaminants, wherein said center portion is designed to be the sole provider of force on the cable wire;

inserting the cable wire through said center portion in a direction perpendicular to the wall to allow said cable supports to abut against the cable wire in an alignment;

skewing/pivoting the cable wire on said connector so that the cable projects outward from the connector at a 45 or less degree angle rather than at its normal 90 degrees; and sliding off the cable wire from said connector once said cable supports are mis-aligned with each other.

44. A cord connector for providing strain relief to a wire, the cord connector comprising:

a rigid skeleton having a sole wire passageway defined by a circumferential hoop with deflectable appendages extending from said circumferential hoop, said deflectable appendages being deflected by the passage of the wire through said wire passageway, said deflectable appendages designed to further restrict the removal of the wire back through said wire passageway; and a pliable shell adjoining said rigid skeleton and configured to wrap around the wire in the sole wire passageway, wherein said sole wire passageway minimizes the thickness of the cord connector.

45. A cord connector as set forth in claim 44 further comprising:

at least one tab spaced from a flange wherein said tab is deflectable so as to be pushed through a wall opening and wherein said flange prevents the further movement of the connector through the opening.

46. A cord connector according to claim 44, wherein each of said appendages are separated from other appendages by slits therebetween on said circumferential hoop, said slits providing additional flexibility to said appendages.

47. A cord connector according to claim 45, wherein said flange is of a size and a slits provide additional uniform flexibility to said circumferential hoop, to accommodate and seal wide range of knock-out hole tolerances.

48. A cord connector according to claim 45, wherein said flange includes a head side and a tail side, and knobs are provided on said tail side, protruding over said pliable shell.

49. A cord connector according to claim 45, further including two additional tabs to provide stability when the connector is inserted into the wall.

50. A cord connector according to claim 46, wherein the thickness of said appendages narrows toward an intermediate position of a slit section and includes a distinct boundary on its top to facilitate its deflection at said intermediate position of a slit section.

* * * * *